US009696855B2

(12) United States Patent
Watanabe et al.

(10) Patent No.: US 9,696,855 B2
(45) Date of Patent: Jul. 4, 2017

(54) INFORMATION PROCESSING TERMINAL, INFORMATION PROCESSING METHOD, AND COMPUTER PROGRAM (71) Applicant: CANON KABUSHIKI KAISHA, Tokyo (JP)

(72) Inventors: Kazuhiro Watanabe, Tokyo (JP); Takeshi Nakata, Kawasaki (JP); Wataru Kaku, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 23 days.

(21) Appl. No.: 14/680,916

(22) Filed: Apr. 7, 2015

(65) Prior Publication Data

US 2015/0293644 A1 Oct. 15, 2015

(30) Foreign Application Priority Data

Apr. 10, 2014 (JP) .................................. 2014-081476

(51) Int. Cl.
*G06F 3/042* (2006.01)
*G06F 3/01* (2006.01)
*G06F 3/023* (2006.01)
*G06F 3/0488* (2013.01)
*G06F 1/16* (2006.01)
(Continued)

(52) U.S. Cl.
CPC ....... *G06F 3/0426* (2013.01); *G02B 27/0172* (2013.01); *G06F 1/163* (2013.01); *G06F 3/011* (2013.01); *G06F 3/017* (2013.01); *G06F 3/0237* (2013.01); *G06F 3/0304* (2013.01);
(Continued)

(58) Field of Classification Search
CPC ...... G02B 2027/0138; G02B 2027/014; G02B 27/0172; G06F 1/163; G06F 3/011; G06F 3/017; G06F 3/0237; G06F 3/0304; G06F 3/0426; G06F 3/04886
See application file for complete search history.

(56) References Cited

U.S. PATENT DOCUMENTS 8,228,315 B1* 7/2012 Starner ................ G02B 27/017
345/175
8,482,527 B1* 7/2013 Kim ........................ G06F 3/011
345/168
(Continued)

FOREIGN PATENT DOCUMENTS

JP       2013-172432 A       9/2013

*Primary Examiner* — Michael J Jansen, II
(74) *Attorney, Agent, or Firm* — Canon U.S.A., Inc. IP Division (57) ABSTRACT An information processing terminal includes an imaging unit images a video in front of a user, a display unit overlaps and displays an image of a keyboard therein as a virtual object on a scene in the real world, a recognition unit recognizes a touch on an actual object in the real world, a determination unit, when the recognition unit recognizes a touch on the actual object, determines that a touch operation is performed on the keyboard overlapped and displayed on the actual object, and a generation unit generates a character string by key codes of keys corresponding to touch positions on the displayed keyboard that is a virtual object, wherein when the generated character string is a meaningless character string, one or more modified candidate character strings obtained by shifting each character included in the character string by a predetermined amount on the keyboard are generated.

8 Claims, 10 Drawing Sheets (51) Int. Cl.
  *G06F 3/03* (2006.01)
  *G02B 27/01* (2006.01)
(52) U.S. Cl.
  CPC .... *G06F 3/04886* (2013.01); *G02B 2027/014* (2013.01); *G02B 2027/0138* (2013.01)

(56) References Cited

U.S. PATENT DOCUMENTS

| | | | |
|---|---|---|---|
| 9,069,164 B2* | 6/2015 | Starner | G02B 27/017 |
| 2006/0007056 A1* | 1/2006 | Ou | G02B 27/017 |
| | | | 345/8 |
| 2010/0177035 A1* | 7/2010 | Schowengerdt | G06F 1/163 |
| | | | 345/156 |
| 2012/0115543 A1* | 5/2012 | Lin | G03B 29/00 |
| | | | 455/556.1 |
| 2012/0120103 A1* | 5/2012 | Border | G02B 27/017 |
| | | | 345/633 |
| 2012/0154287 A1* | 6/2012 | Takei | G06F 3/0237 |
| | | | 345/168 |
| 2013/0016070 A1 | 1/2013 | Starner | |
| 2013/0021256 A1* | 1/2013 | Manzen | G06F 3/04886 |
| | | | 345/168 |
| 2013/0021259 A1* | 1/2013 | Sudo | G06F 3/04883 |
| | | | 345/169 |
| 2014/0059472 A1* | 2/2014 | Zhaiek | G06F 3/04842 |
| | | | 715/773 |
| 2015/0121287 A1* | 4/2015 | Fermon | G06F 3/016 |
| | | | 715/773 |
| 2015/0293602 A1* | 10/2015 | Kay | G06F 3/04883 |
| | | | 345/168 |
| 2016/0253044 A1* | 9/2016 | Katz | G06F 3/017 |

* cited by examiner

| AMOUNT OF SHIFT | MODIFIED CANDIDATE |
|---|---|
| NO | lpmmmoyojs |
| ONE CHARACTER TO LEFT | ;@,,,pupkd |
| ONE CHARACTER TO RIGHT | konnnitiha |
| ONE CHARACTER TO LOWER LEFT | p-kkk070ie |
| ONE CHARACTER TO UPPER LEFT | .;△△△ljlmx |
| ONE CHARACTER TO LOWER RIGHT | oOjjj969uw |
| ONE CHARACTER TO UPPER RIGHT | ,l△△△kgknz |
| ... | ... |

INFORMATION PROCESSING TERMINAL, INFORMATION PROCESSING METHOD, AND COMPUTER PROGRAM

BACKGROUND OF THE INVENTION

Field of the Invention

The present invention relates to an information processing terminal such as head mounted display for augmented reality display which is mounted on the head of a user to display a graphic overlapped on a scene in the real world.

Description of the Related Art

Recent information processing terminals such as Smartphone include a touch display in which a display unit and a touch input unit are integrally configured. In such information processing terminals, a "touch graphical user interface (GUI) (referred to as "GUI" below)" by which a user touches a GUI for displaying the functions and setting via the touch display to give an instruction has various advantages and is typically used.

On the other hand, in a head mounted display (HMD) (referred to as "HMD" below), a user mounts a display unit on the head, and thus the display unit and a touch input unit cannot be integrally configured, and a touch display cannot be employed.

Thus, like a technique discussed in United States Patent Application Publication No. 2013/0016070, for example, a method for projecting a GUI on a real object such as arm or hand and detecting a touch on the projected GUI to use the touch GUI for the HMD is discussed. Japanese Patent Application Laid-Open No. 2013-172432 discusses therein that a virtual user interface (UI) is attached and displayed on an object in the real space and a fingertip of a user touches the object thereby to operate the virtual UI.

However, when a GUI is projected and displayed on a real object such as arm or hand, it may be difficult to see the display due to a reflectivity of the object or brightness of a surrounding environment. Further, a specific object such as arm or hand on which a GUI is projected has to be accurately present within a projection range.

SUMMARY OF THE INVENTION

The present invention is directed to providing a HMD-type information processing terminal for enabling a touch GUI to be easily seen by a user.

The present invention includes an imaging unit configured to image a video in front of the head of a user, a display unit configured to overlap and display an image of a virtual object on a scene in the real world, a touch recognition unit configured to recognize a touch by the user on an actual object in the real world, and an information processing unit. The information processing unit overlaps and displays a GUI for touch operation on an actual object in the real world by the display unit. Further, when the touch recognition unit recognizes a touch by the user on the actual object, the information processing unit determines that a touch operation is performed on the GUI overlapped and displayed on the actual object.

Further features of the present invention will become apparent from the following description of exemplary embodiments with reference to the attached drawings.

DESCRIPTION OF THE EMBODIMENTS

Exemplary embodiments of an information processing terminal, an information processing method and a program according to the present invention will be described below in detail with reference to the drawings.

An example in which the present invention is employed for a HMD as an exemplary information processing terminal will be described according to a first exemplary embodiment.

A HMD employs a glass see-through system for projecting a graphic on transparent or semi-transparent half mirrors and a video see-through system for electrically overlapping a graphic on a scene in the real world imaged by an imaging apparatus. Differences in the hardware structures between both of them will be described below.

Figure 1:
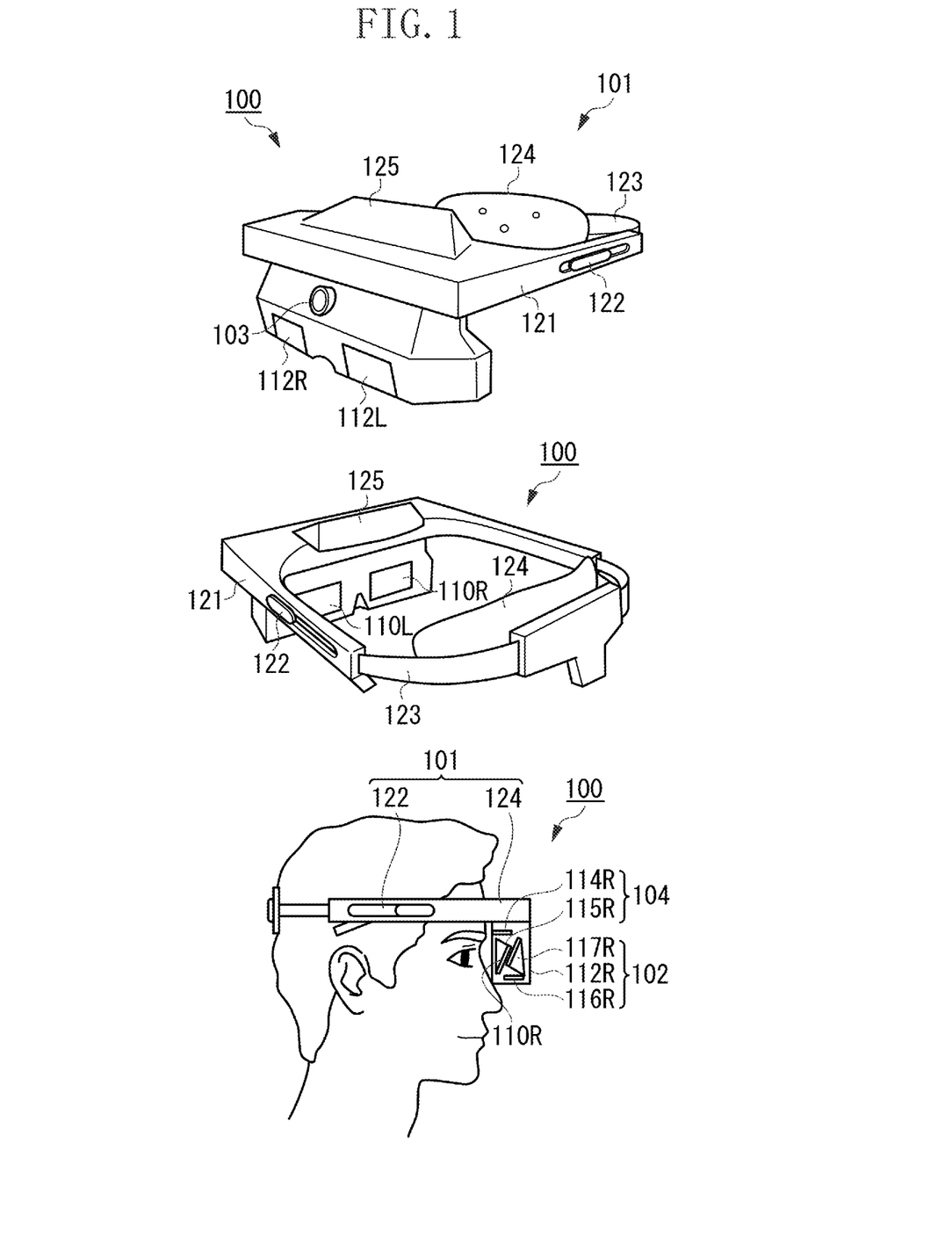
FIG. 1 is a diagram illustrating appearances of a head mounted display (HMD) 100 according to a first exemplary embodiment of the present invention.

FIG. 1 is a diagram illustrating appearances of a HMD 100 according to the present exemplary embodiment.

The HMD 100 includes a head mounting unit 101 for mounting the HMD 100 on the head of a user, an imaging unit 102 for imaging a video in front of the head of the user, and a display unit 104 for displaying a graphic.

The head mounting unit 101 is used for mounting the HMD 100 according to the present exemplary embodiment on the head of a user, and includes a temporal mounting unit 121, an adjuster 122, a length adjustment unit 123, an occipital mounting unit 124, and a forehead mounting unit 125.

To mount the HMD 100 on the head, the user first puts the HMD 100 on the head with the length adjustment unit 123 loosened by the adjuster 122. Then, the forehead mounting unit 125 is tightly closed to the forehead and the length adjustment unit 123 is fastened by the adjuster 122 such that the temporal mounting unit 121 and the occipital mounting unit 124 are tightly closed to the temporal parts and the occipital part, respectively. The head mounting unit 101 may employ various types such as glasses frame type and helmet type in addition to the goggle type illustrated in FIG. 1.

The imaging unit 102 is a digital camera, and includes incident windows 112L, 112R, imaging sensors 116L, 116R, and optical prisms 117L, 117R. The imaging unit 102 captures an image in substantially the same direction (corresponding to a field of view of the user) as a direction in which the head of the user mounting the HMD 100 according to the present exemplary embodiment on the head faces. Specifically, light incident from the outside of the HMD via the incident windows 112L, 112R is guided into the HMD 100 via the optical prisms 117L, 117R, and are received by the imaging sensors 116L, 116R to be imaged.

The display unit 104 includes screens 110L, 110R, color liquid crystal displays 114L, 114R, and optical prisms 115L, 115R. The characters L and R at the tail of a reference numeral indicate the left eye and the right eye, respectively. The display unit 104 is provided at a position corresponding to the lenses of a pair of glasses to correspond to the positions of the eyes of the user. Specifically, images displayed by the color liquid crystal displays 114L and 114R are guided by the optical prisms 115L and 115R to be displayed on screens 110.

When the HMD 100 is of the video see-through type described above, the screens 110L and 11R do not have transmittance in principle, and display the display light guided by the optical prisms 115L and 115R from the color liquid crystal displays 114L and 114R, as it is. To the contrary, when the HMD 100 is of the glass see-through type described above, the screens 110L and 110R include half mirrors. That is, the screens 110L and 110R have certain transmittance, and the user can optically see a scene in the real space. At the same time, the display light of a graphic displayed by the color liquid crystal displays 114L and 114R and guided by the optical prisms 115L and 115R are reflected in a direction of the eyes of the user by the mirrors provided on the surface or backside or embedded in the inside. That is, in the case of the glass see-through type, a scene in the real world and an image (graphic) of a virtual object are optically overlapped on the screens 110L and 110R.

Output light of the optical prisms 115L and 115R in the display unit 104 and input light of the optical prisms 117L and 117R in the imaging unit 102 passes through the optical axes of the pupils of the user, and the imaging sensors 116L and 116R image videos in the real space viewed depending on a position of the user or a direction of the head.

In the case of the video see-through type HMD, the color liquid crystal displays 114L and 114R display thereon an image in which a video in the real space imaged by the imaging sensors 116L and 116R and an image (graphic) of a virtual object are electrically overlapped (image combination). On the other hand, in the case of the glass see-through type HMD, the color liquid crystal displays 114L and 114R display thereon only an image (graphic) of a virtual object in principle.

Figure 2:
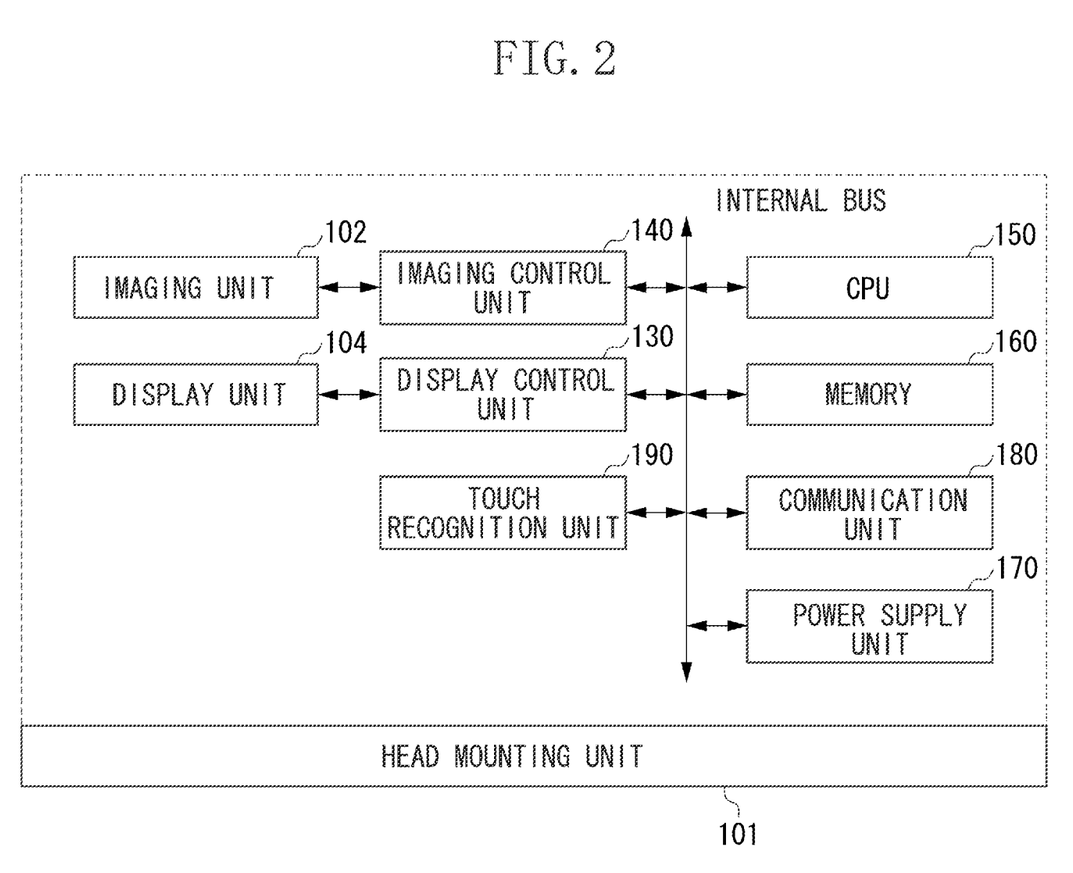
FIG. 2 is a block diagram illustrating an exemplary structure of the HMD according to the present exemplary embodiment.

FIG. 2 is a block diagram illustrating an exemplary structure of the HMD 100 according to the present exemplary embodiment.

The HMD 100 further includes a display control unit 130, an imaging control unit 140, a central processing unit (CPU) 150, a memory 160, a power supply unit 170, a communication unit 180, and a touch recognition unit 190 which are embedded inside the main body including the head mounting unit 101 and are not apparently illustrated in FIG. 1.

The display control unit 130 performs display control on the display unit 104. For example, the display control unit 130 controls motions or changes in brightness along with changes in size, position, orientation, color, transmittance of an image (graphic) of a virtual object to be overlapped and displayed (image combination) on a video in the real space, for example. The image of the virtual object includes an image of a GUI such as menu display, or a keyboard through which instructions of the user are input.

The imaging control unit 140 performs exposure control and measurement control based on calculation results in a predetermined calculation processing by use of imaging data. Thereby, the autofocus (AF) processing, the auto-exposure (AE) processing, the auto-white balance (AWB) processing, and the like are performed. When the imaging unit 102 includes a mechanism for inserting/removing an optical filter into/from an optical path, or a vibration-proof mechanism, insertion/removal of a filter, and prevention of vibration are controlled under conditions such as imaging data.

The CPU 150 performs a calculation processing on the entire HMD 100. A program recorded in the memory 160 described below is executed thereby to realize each processing according to the present exemplary embodiment. The memory 160 includes a work area and a non-volatile area. A program read from the non-volatile area, or constants and variables for system control are developed in the work area in the memory 160. Data on an image (graphic) of a virtual object overlapped and displayed in the real space is held for display. Imaging data imaged and A/D converted by the imaging unit 102 is held for image analysis and image processing.

The power supply unit 170 includes a primary battery such as alkaline battery or lithium battery, a secondary battery such as NiCd battery, NiMH battery or Li battery, or an alternating current (AC) adaptor, and supplies power to the entire HMD 100. The power supply unit 170 includes a power supply switch for powering on or off depending on a user operation or other conditions. The communication unit 180 communicates with an information terminal such as a personal computer (PC), or a network such as local area network (LAN) or Internet under control of the CPU 150.

The touch recognition unit 190 recognizes a touch operation by the user on an actual object. For example, the CPU 150 performs a calculation processing on an imaged video by the imaging unit 102 based on a touch recognition program stored in the memory 160 so that the touch recognition unit 190 is realized in software. Alternatively, with a method for measuring a change in electrostatic capacity described below, the touch recognition unit 190 includes an electrostatic capacity measurement device.

Figure 3:
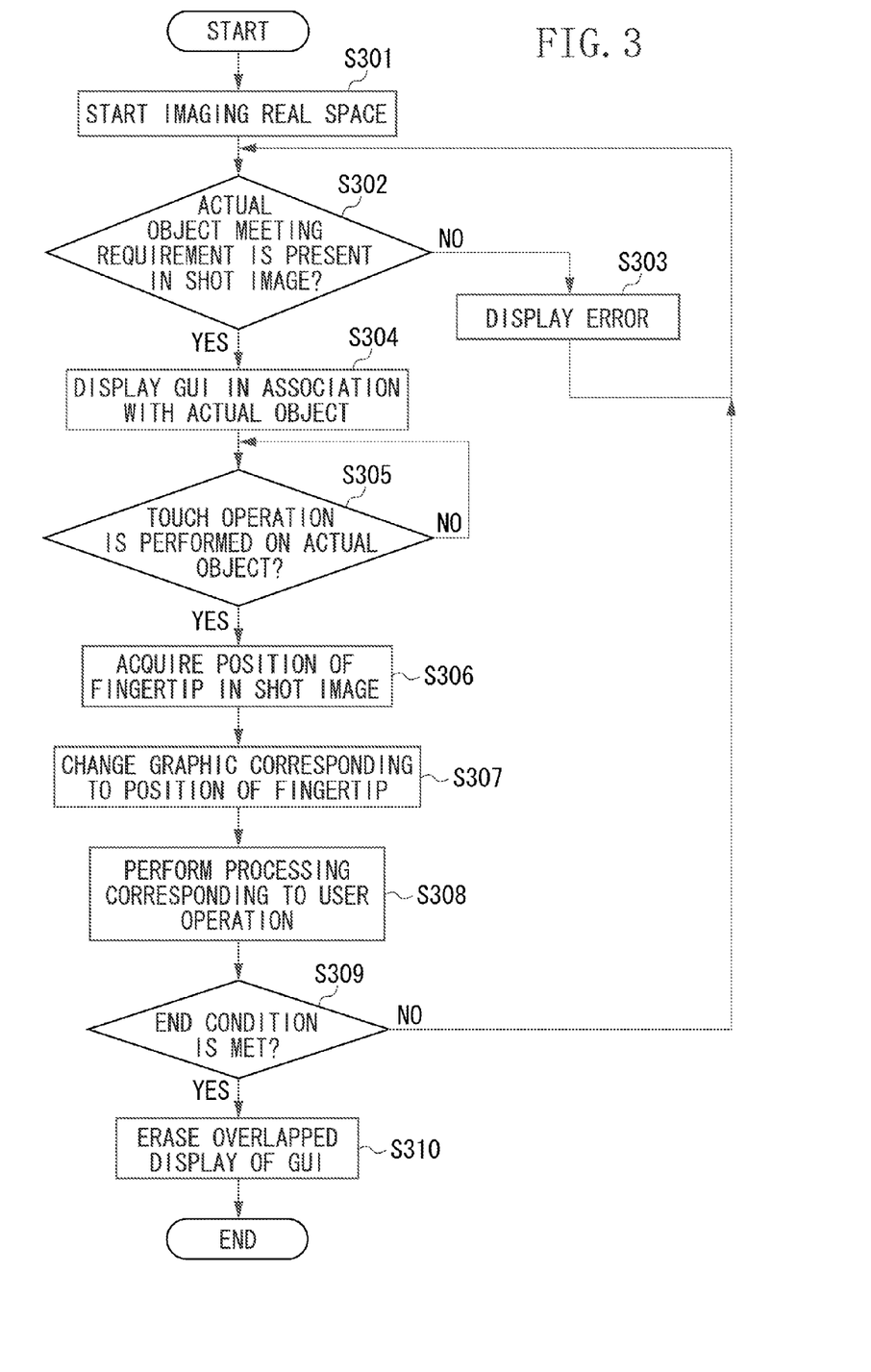
FIG. 3 is a flowchart illustrating a flow of a determination processing in the HMD according to the present exemplary embodiment.

FIG. 3 is a flowchart illustrating a flow of a determination processing in the HMD 100 according to the present exemplary embodiment. The CPU 150 develops, in the work are, and executes a program recorded in the non-volatile area in the memory 160a thereby to realize the determination processing.

When powered on by the user, in step S301, the HMD 100 according to the present exemplary embodiment starts imaging the real space by the imaging unit 102. Then, in step S302, the CPU 150 determines whether an image of an actual object meeting a predetermined requirement is present in the imaged video. The predetermined requirement is, for example, within a predetermined distance (1 meter, for example) from the user, to have a substantially flat area with a certain area or more, or the like. For example, the CPU 150 calculates the coordinates of positions and distances of a contour of the actual object so that the presence of the actual object is determined. The CPU 150 can calculate the coordinates of the positions and distances of the contour of the actual object depending on a difference (disparity) in the positions of the actual object in the videos imaged by the right and left imaging sensors 116R and 116L.

When an actual object meeting such a predetermined requirement cannot be specified (NO in step S302), in step S303, an error or alarm is displayed. Then, in step S304, an image of the GUI is displayed as an augmented reality image in association with the specified actual object. That is, the CPU 150 calculates the positions on the screens 110L and 110R corresponding to the positions of the actual object in the imaged videos, and overlaps and displays the graphic of the buttons of the GUI at the calculated positions. When the user (wearer) of the HMD 100 shakes the head and the positions of the actual object in the imaged videos change, the CPU 150 accordingly changes the positions where the graphic is overlapped and displayed. When the user (wearer) moves closer to or away from the actual object and a size of the actual object in the imaged videos changes, the CPU 150 accordingly changes the size of the graphic to be overlapped and displayed.

Then, in step S305, a determination is made as to whether the user performs a touch operation on the specified actual object. The touch operation includes the following specific operations.

The specific operations include "touch an actual object" (referred to as "touch down" below), "keep touching an actual object" (referred to as "touch on" below), "move while touching an actual object" (referred to as "move" below), "touch an actual object with two fingers and move the fingers to narrow the interval therebetween" (referred to as "pinch in" below), "touch an actual object with two fingers and move the fingers to widen the interval therebetween" (referred to as "pinch out" below), "release a finger touching an actual object" (referred to as "touch up" below), and "not touch an actual object" (referred to as "touch off" below).

Whether the user performs a touch operation on an actual object can be determined by touch recognition with a method for measuring a change in electrostatic capacity or a method for measuring a distance between the actual object and a finger of the user, for example. Measuring a change in electrostatic capacity is directed to determining that "touch is done" when an electrostatic capacity of a circuit formed between a fingertip of the user and an actual object contacting an electrostatic capacity measurement device mounted on the head of the user is measured and a certain or more change occurs, for example. A distance between the actual object and a finger of the user can be measured by use of the triangulation method using a difference (disparity) of the positions of the finger in the videos imaged by the imaging sensors 116L and 116R, for example. Alternatively, it may be determined that "touch is done" when an ultrasonic measurement sensor is installed on a fingertip of the user or an actual object to measure a distance based on a reflection time of ultrasonic waves or sonic waves, and a difference in distance between the actual object and the finger of the user reaches almost 0. Alternatively, it may be determined that "touch is done" due to a change in density (brightness) of "shade" of a finger of the user on an actual object or a change in distance between the "shade" and the finger (fingertip) of the user in the videos imaged by the imaging sensors 116L and 116R. The techniques are all known, and are practically applicable.

When it is determined that the user has performed a touch operation on an actual object (YES in step S305), in step S306, the position of the fingertip of the user in the shot image is acquired. If two or more portions which are determined as fingertips are present, all the positions of the two or more portions are acquired. Then, in step S307, a processing of changing a graphic displayed (overlapped and displayed) at the positions corresponding to the acquired positions of the fingertips is performed. For example, the "pinch out" operation by two fingers of the user is detected while the graphic of an image such as "photograph" is overlapped and displayed, a processing of enlarging the graphic of the image such as "photograph" is performed.

It is assumed that two or more fingertip positions are acquired while a graphic such as virtual keyboard assuming a touch operation with one finger of a user is being displayed. At this time, it is assumed that the "touch down" operation is performed on a graphic element (any key on the virtual keyword while the virtual keyboard is being displayed) corresponding to a position with the largest amount of motion among the positions of the fingertips. In such a case, a graphic processing is performed such that the graphic element (such as any key) seems to be concave.

In step S308, an information processing such as text input corresponding to the operation is performed, and, in step S309, a determination is made as to whether a predetermined end condition is met. For example, a determination is made as to whether the "close" button allocated for erasing the virtual keyboard is designated by the user in the touch down operation or whether a touch operation is performed on the GUI serving as an image of a virtual object. When a touch operation is performed (YES in step S309), in step S310, the overlapped display of the GUI serving as an image of a virtual object is erased and the processing illustrated in FIG. 3 end.

According to the present exemplary embodiment, a GUI for a touch operation is overlapped and displayed on an actual object in the real world. Then, when a touch by the user on the actual object is recognized, it is determined that a touch operation on the GUI overlapped and displayed on the actual object is performed. Therefore, the touch GUI by which the user can easily see the GUI can be realized irrespective of the reflectivity of the actual object or brightness of a surrounding environment.

Further, according to the present exemplary embodiment, the user performs a touch operation on an actual object and thus can accurately receive a sensible response, and operability enhances as compared with a method for imaging a gesture operation of a finger performed in the air by the user and determining operation input. "Touched" or "not touched" can be distinctly discriminated as compared with a gesture operation performed in the air, and thus distinguishability for the operations of the user enhances and erroneous operations due to erroneous discrimination can be reduced.

According to a second exemplary embodiment, a HMD serving as an exemplary information processing terminal according to the present invention performs display in an overlapping manner on an actual object in the real world to promote the user to touch it. When recognizing a touch by the user on the actual object, the HMD determines a display position of the GUI based on the recognized touch position. The HMD according to the present exemplary embodiment is configured in the same manner as the HMD 100 according to the first exemplary embodiment illustrated in FIG. 1 and FIG. 2.

When the HMD is of the video see-through type described above, a scene in the real world displayed on the display unit 104 is imaged by the imaging unit 102, and thus it is possible to easily cause a display position coordinate of the actual object in the display unit 104 to accord with a position coordinate in the imaged video.

To the contrary, when the HMD is of the glass see-through type described above, for example, outer edges are provided on the screens (half mirrors) 110R and 110L and the distances relative to the eyes of the user are adjusted so as to cause an imaging angle of view of the imaging unit 102 to substantially accord with a view angle of the user. Even in this way, a position of the visually recognized actual object and a position of the actual object in an imaged video may be shifted from each other depending on a mounting state of the HMD when the user views the actual object through the screens (half mirrors) 110L and 110R.

In this case, a position where the graphic is overlapped and displayed on a position corresponding to the actual object is shifted from a position of the actual object visually recognized by the user. Alternatively, a position of the graphic recognized as touched by the user is shifted from a position of the graphic determined as touched by the user based on the position of a finger of the user in the imaged video.

To prevent such a "shift", a calibration processing of causing the coordinates of the display positions on the screens 110L and 110R of the graphic recognized as touched by the user to accord with the coordinate of a position touched by the user in an imaged video may be performed.

Therefore, the HMD according to the present exemplary embodiment performs display in an overlapping manner on an actual object in the real world to promote the user to touch it. Then, when a touch by the user on the actual object is recognized, a display position of the GUI is determined based on the recognized touch position. Thereby, calibration is made such as to cause a position of the actual object visually recognized by the user to accord with a position of the actual object in a video from the imaging unit 102 for displaying the GUI.

Figure 4:
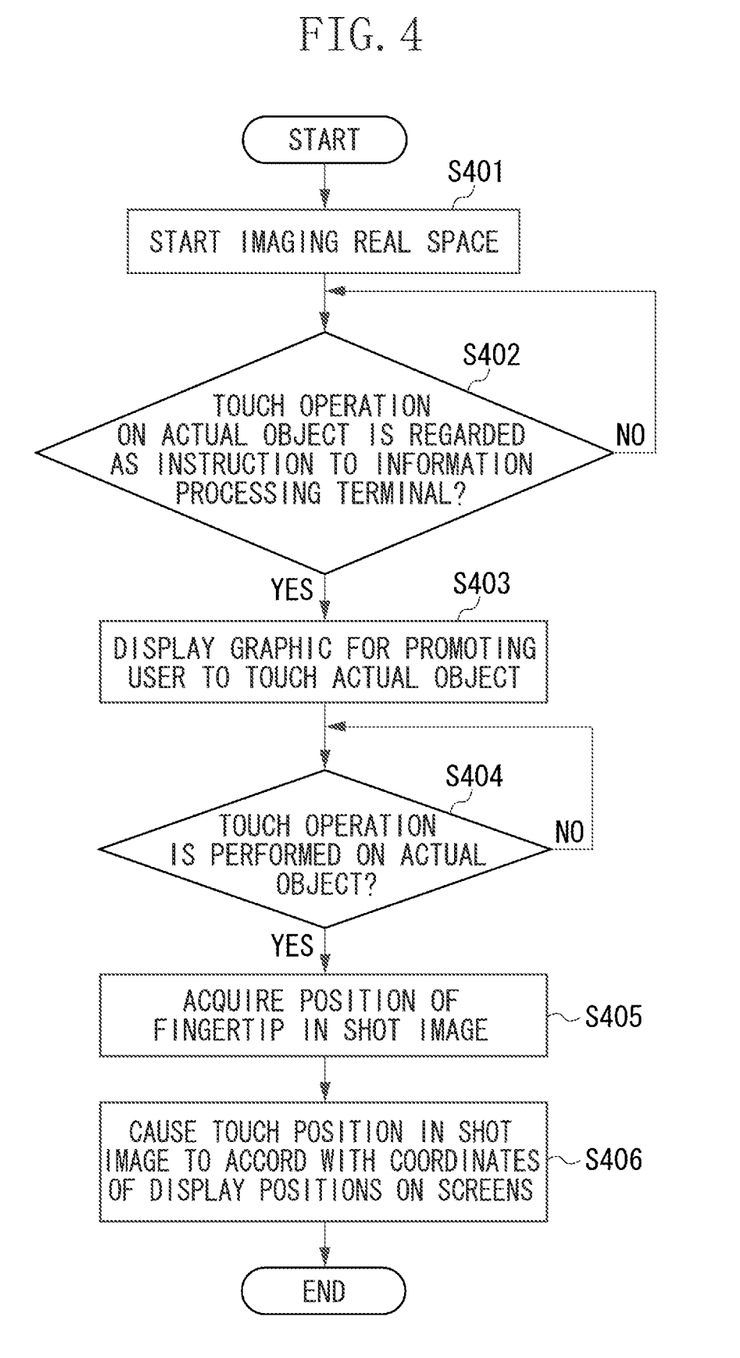
FIG. 4 is a flowchart illustrating a flow of a determination processing in a HMD according to a second exemplary embodiment of the present invention.

FIG. 4 is a flowchart illustrating a flow of a determination processing in the HMD according to the present exemplary embodiment.

When powered on by the user, in step S401, the HMD according to the present exemplary embodiment starts imaging the real space by the imaging unit 102. Then, in step S402, the CPU 150 determines whether to start a processing of receiving a touch operation by the user on an actual object as an instruction operation to the HMD according to the present exemplary embodiment based on a predetermined requirement. The predetermined requirement may be that a position/angle sensor detects that the user mounting the HMD according to the present exemplary embodiment thereon does not move (is not walking), for example. When determining to start the processing (YES in step S402), in step S403, the CPU 150 first displays a graphic for promoting the user to touch an actual object at predetermined position coordinates on the screens (half mirrors) 110L and 110R.

In step S404, the CPU 150 then determines whether a touch operation by the user on an actual object has been performed. When determining that a touch operation by the user on an actual object has been performed (YES in step S404), in step S405, the CPU 150 acquires a position coordinate of the fingertip of the user in the imaged video. If two or more portions which may be determined as fingertips are present, the position coordinate of a portion with the largest amount of motion among the portions of the fingertips is acquired.

Thereafter, in step S406, the CPU 150 performs a calibration processing of causing the acquired position coordinate in the imaged video to accord with the coordinates of the predetermined display positions where the graphic for promoting the touch is displayed on the screens (half mirrors) 110L and 110R. Thereafter, the CPU 150 determines the display positions of the GUI on the screens (half mirrors) 110L and 110R based on the calibrated touch position in the video imaged by the imaging unit 102.

Figure 5A:
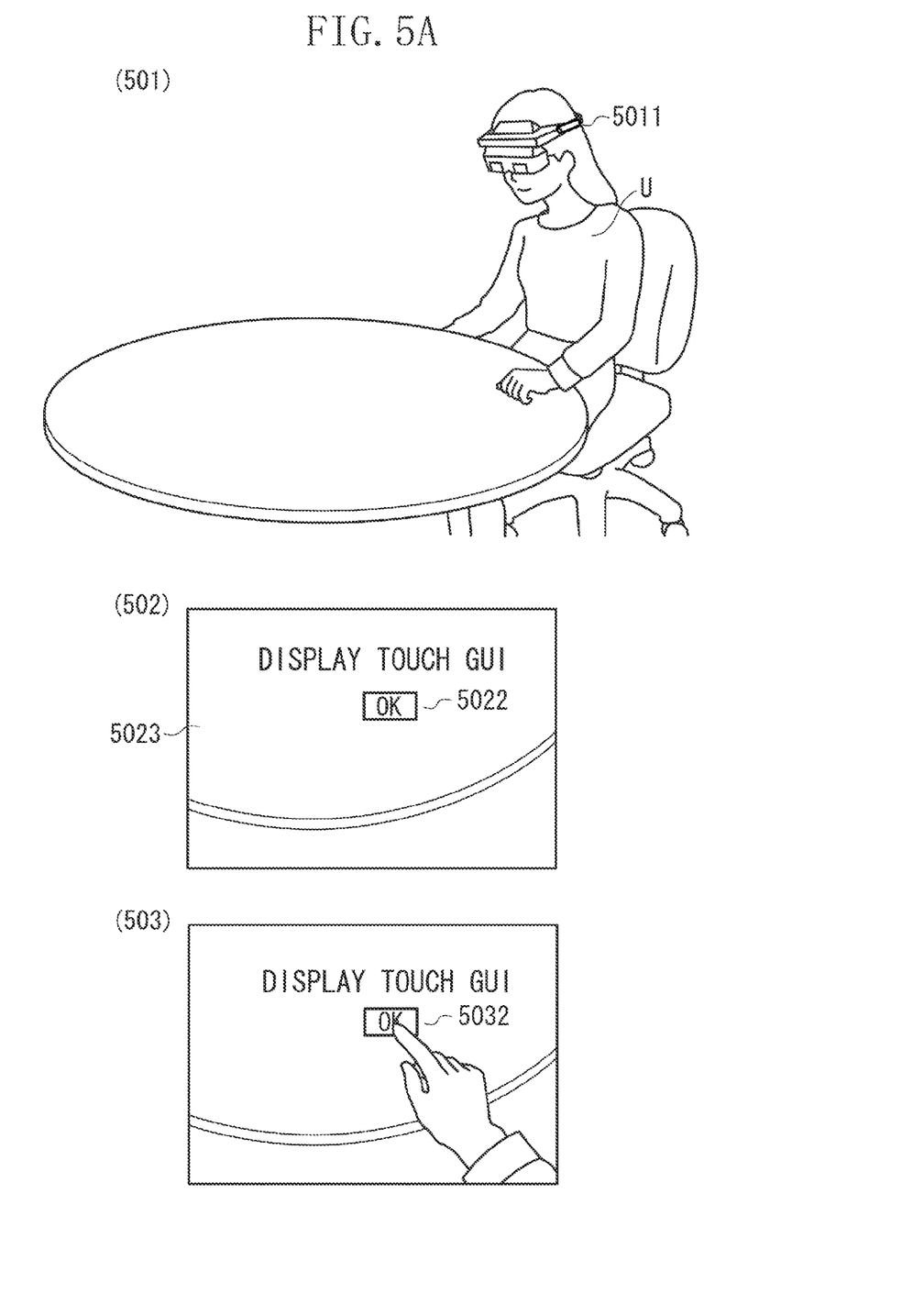
FIG. 5A is a diagram schematically illustrating how the HMD according to the present exemplary embodiment promotes a user to touch an overlapped actual object in the real world.
Figure 5B:
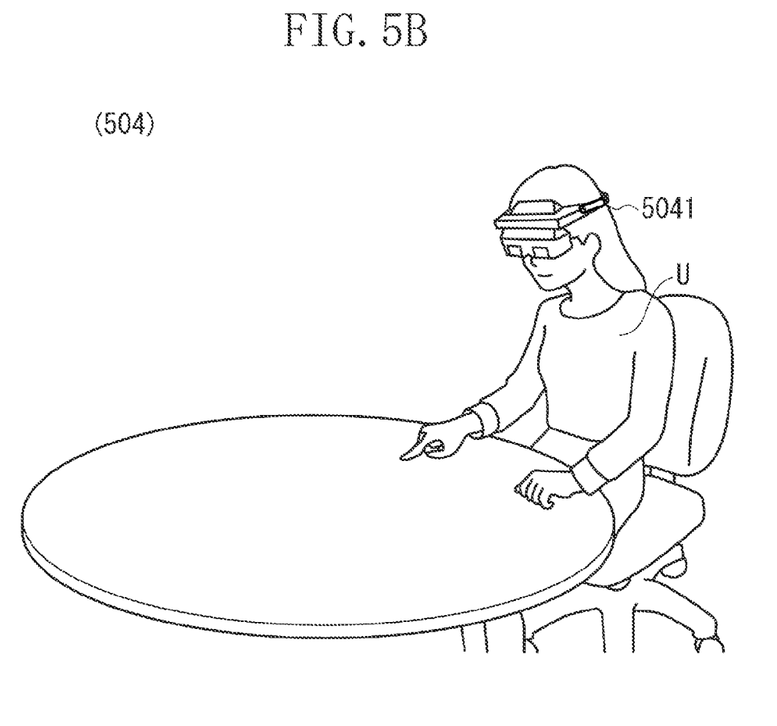
FIG. 5B is a diagram schematically illustrating how to determine a display position of a graphical user interface (GUI) based on a recognized touch position when the HMD according to the present exemplary embodiment recognizes the touch by the user on the actual object.

FIG. 5A is a diagram illustrating the states in which the HMD according to the present exemplary embodiment performs display to promote the user to touch an overlapped actual object in the real world. FIG. 5B is a diagram schematically illustrating how to determine a display position of the GUI based on a recognized touch position when the touch by the user on the actual object is recognized.

The user U mounting a HMD 5011 according to the present exemplary embodiment and the real world in which the user U is present are indicated by reference numeral 501. A form 502 of augmented reality display viewed by the user U is illustrated. A graphic 5022 for promoting the user to touch is overlapped and displayed on a table 5023 serving as an actual object. A form 503 of augmented reality display viewed by the user U similarly indicates how the user U is touching a graphic 5032 via a touch on the actual object with a finger. A form 504 of the situation of the form 503 from the same point of view as the reference numeral 501 is illustrated.

A position on the actual object which the user U is touching should correspond to a display position of the graphic for promoting the user to touch as viewed from the user U. That is, the position coordinate of a point which the user U is touching in the imaged video should correspond to the position coordinates of the display positions of the graphic 5032 on the screens (half mirrors) 110L and 110R as viewed from the user U. The GUI displayed at the positions on the screens (half mirrors) 110L and 110R corresponding to the touch position (position of the fingertip) in the imaged video is set to be subjected to touch operation/instruction based on the correspondence information. In this way, as far as a mounting state of the HMD on the user U is constant, a position of the graphic recognized as touched by the user is not shifted from a position of the graphic determined as touched by the user based on the position of a finger in the imaged video.

That is, according to the present exemplary embodiment, also with a glass see-through type HMD, it is possible to cause a position coordinate on the display unit 104 visually recognized as touched by the user to accurately accord with a position coordinate of the touch operation in the imaged video. Thereby, the touch GUI for recognizing a touch operation by the user on the actual object in the real world as a touch operation on the GUI in the augmented reality display is enabled.

According to a third exemplary embodiment, a HMD serving as an exemplary information processing terminal according to the present invention displays a keyboard arranging a plurality of keys therein as an image of a virtual object (keyboard display), and recognizes a touch by the user on the displayed keyboard. The HMD generates a character string based on the key codes of the keys corresponding to the touch positions (character string generation), and determines whether the generated character string is a meaningful character string having a meaning or a meaningless character string having no meaning (meaning determination). When determining that the character string is a meaningless character string, the HMD generates one or more modified candidate character strings obtained by shifting each character included in the character string by a predetermined amount on the keyboard (modified candidate generation). Further, the HMD changes allocation of a touch position corresponding to each key on the keyboard depending on the amount of shift at the time when the generated modified candidate character string is a meaningful character string (touch position allocation). The HMD according to the present exemplary embodiment is configured in the same manner as the HMD 100 according to the first exemplary embodiment illustrated in FIG. 1 and FIG. 2.

With the HMD according to the second exemplary embodiment described above, even when the HMD is of the glass see-through type, a position on an actual object touched by the user is associated with a display position of a graphic overlapped and displayed on a scene in the real world. Therefore, if a mounting state of the HMD on the user is constant, the user performs a touch operation on the actual object thereby to realize operation/instruction as if he/she is performing a touch operation on the overlapped and displayed graphic.

However, if a mounting state changes when the user shakes the head, for example, a position of the actual object viewable to the user is shifted from a display position of the overlapped and displayed graphic. In such a state, a "shift" may be caused between a position touched again by the user and a corresponding display position of the GUI.

The HMD according to the present exemplary embodiment eliminates the "shift" as follows.

That is, when a character string corresponding to the key codes acquired by a touch operation by the user is a meaningless character string, the HMD according to the present exemplary embodiment generates one or more modified candidate character strings acquired by shifting each character included in the character string by a predetermined amount on the keyboard. Further, the HMD changes allocation of a touch position corresponding to each key on the keyboard depending on the amount of shift at the time when the generated modified candidate character string is a meaningful character string based on whether the character string having a meaning or not.

Figure 6A:
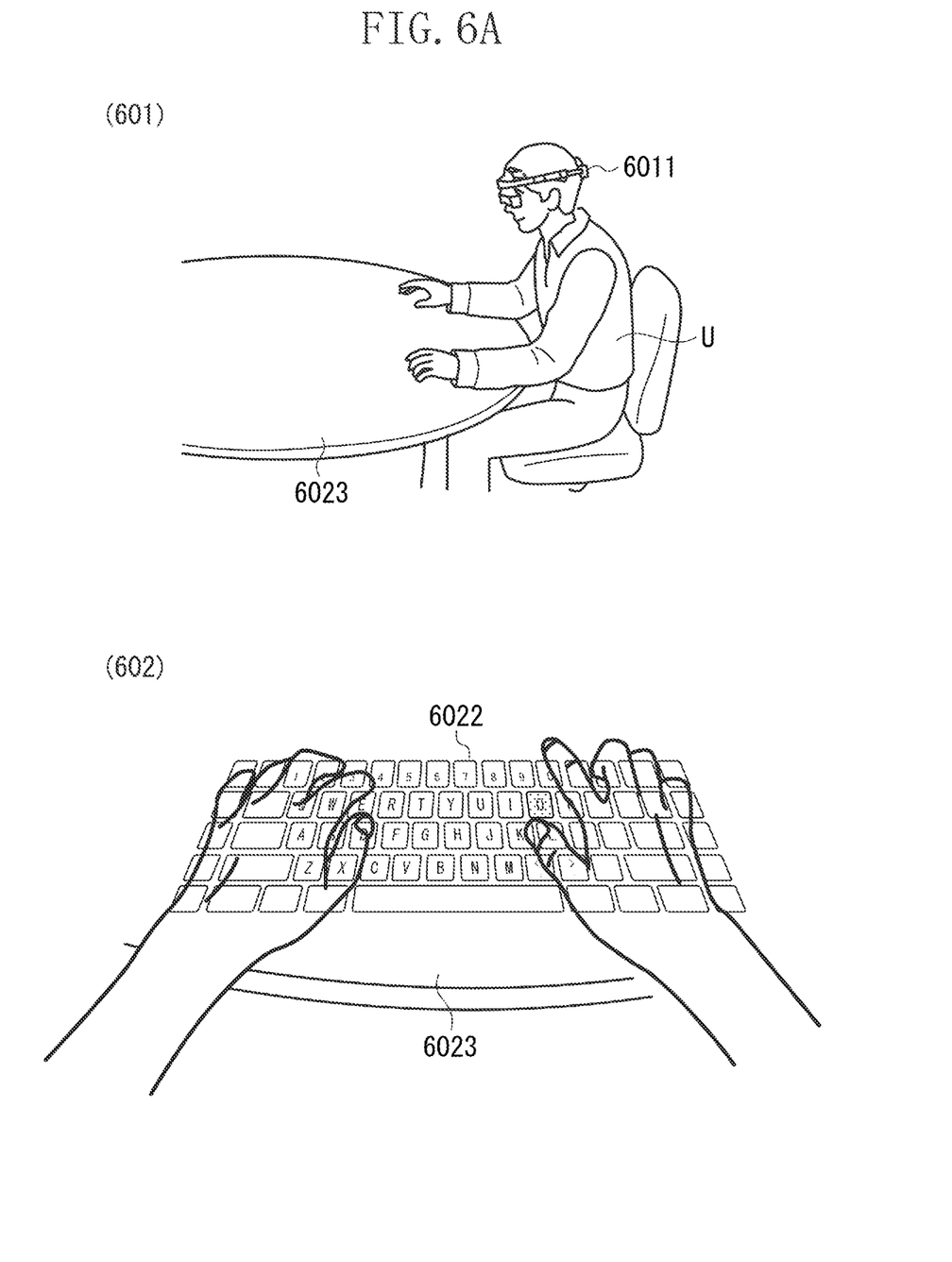
FIG. 6A is a diagram schematically illustrating how a HMD as an exemplary information processing terminal according to a third exemplary embodiment of the present invention overlaps a keyboard on an actual object for augmented reality display and recognizes a touch by a user thereon.
Figure 6B:
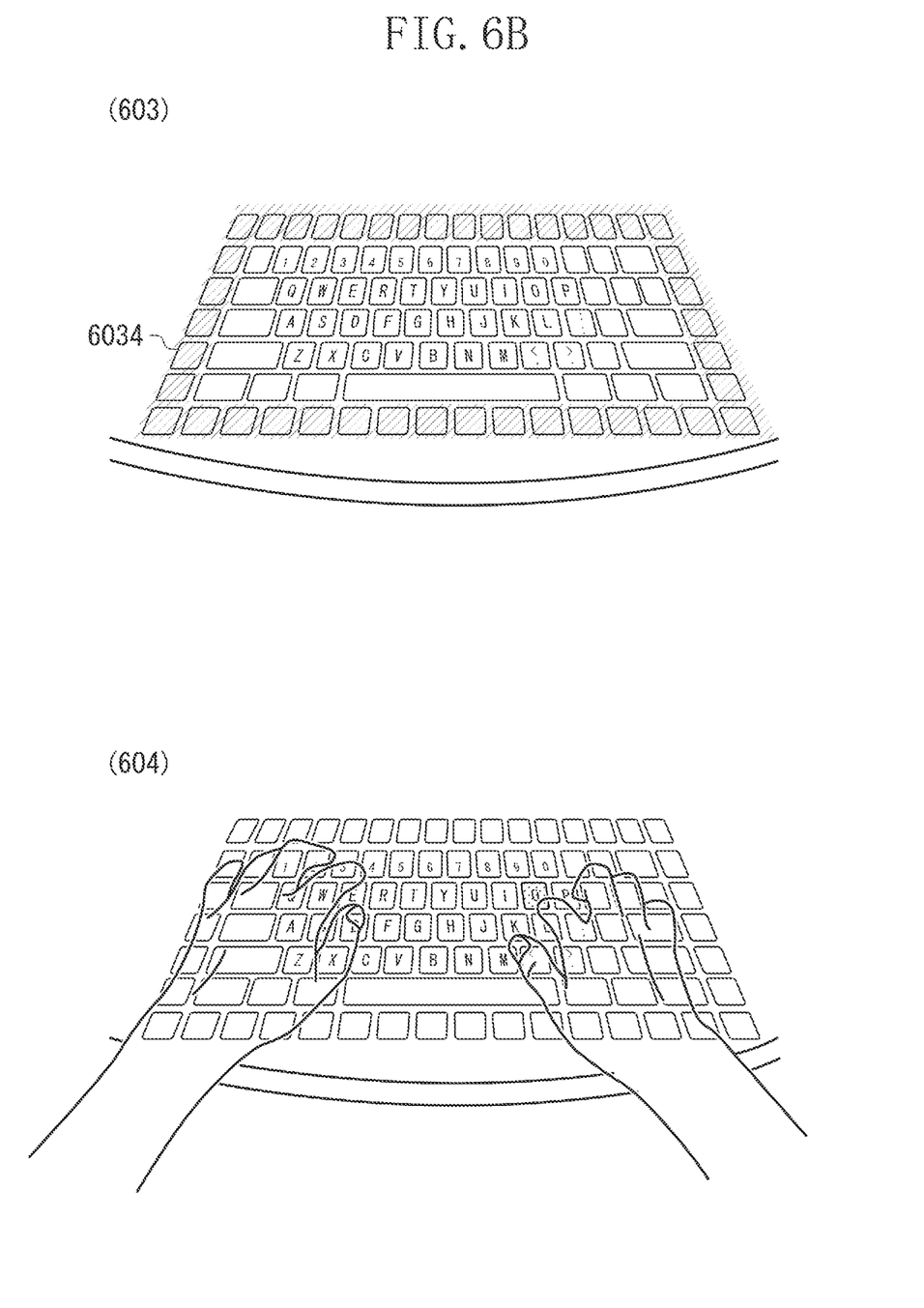
FIG. 6B is a diagram schematically illustrating how the HMD according to the present exemplary embodiment changes an allocated touch position corresponding to each key when determining a character string generated by the touch as a meaningless character string.

FIG. 6A is a diagram illustrating states in which the HMD according to the present exemplary embodiment displays a keyboard overlapped on an actual object (table) in augmented reality. FIG. 6B is a diagram schematically illustrating how to change allocation of a touch position corresponding to each key when a touch by the user is recognized and a character string generated by the touch is determined as a meaningless character string.

The user U mounting a HMD 6011 according to the present exemplary embodiment thereon and the real world in which the user U is present are indicated by reference numeral 601. A form 602 of augmented reality display viewed by the user U via the display unit 104 is illustrated. The form indicates an example in which a graphic 6022 of a keyboard is overlapped and displayed on a table 6023 that is an actual object, by the display unit 104.

Here, the keyboard 6022 is displayed for the user U, but the HMD 6011 according to the present exemplary embodiment provides a virtual key area that is not displayed for the user, around the graphic of the displayed keyboard. The CPU 150 generates key codes other than the key codes corresponding to the respective keys in the displayed keyboard also for a touch operation by the user on the key area.

This is schematically illustrated in reference numeral 603. A shaded area 6034 is not illustrated for the user U in the reference numeral 603, but the CPU 150 generates a key code corresponding to a position when an area of the actual object corresponding to the area is touched. Further, the CPU 150 generates a character string corresponding to the generated key codes.

There the user U designates a key "o" for generating the key code of "o" in a touch operation ("touch down" operation in this case) on the actual object is illustrated in reference numeral 604.

The user of the HMD according to the present exemplary embodiment tries to sequentially designate the keys "k" "o" "n" "n" "n" "i" "t" "i" "h" "a" for inputting Japanese greetings in the Romaji input system.

If a "shift" occurs between a touch position by the user on the actual object and the GUI display corresponding thereto, the key codes generated by the touch operation by the user on the actual object are different from the above state. That is, the key codes of "l" "p" "m" "m" "m" "o" "y" "o" "j" "s" may occur, for example. This is a case in which a "shift" by one key to the right occurs.

According to the HMD of the present exemplary embodiment, CPU 150 determines whether a character string generated by generated key codes is a meaningful character string or a meaningless character string, as needed. The determination timing may be synchronized with a timing when sequentially generated key codes are automatically subjected to character string conversion in the ordinary character input system. Alternatively, a vibration by which a "shift" is likely to occur may be detected by a position/angle sensor, and a determination may be made as to whether a character string is a meaningful character string or a meaningless character string in association with a timing when a vibration is detected.

Whether to determine whether a character string is a meaningful character string or a meaningless character string may be determined based on an attribute of a "text box" into which characters are input. For example, when characters are input into a "text box for password input" into which a meaningless character string may be typically input, a determination as to whether the character string is a meaningful character string or a meaningless character string is not made. By doing so, a meaningless character string may be input as a password. In this case, a character string recognized as input is displayed, and the user may explicitly indicate whether the recognized character string accords with one that the user wants to input.

A virtual key area is provided around the graphic of the displayed keyboard and key codes are generated also for a touch operation by the user on the area because of the following reasons. For example, it is assumed that the user is designating a numerical key at the upper end of the keyboard by touching the actual object, while due to a "shift" between the touch position and the GUI display corresponding thereto, a position upward the position is recognized as touched. In such a case, if the virtual key area is not provided, "shifted key codes" corresponding to the touches are not generated. The user cannot estimate how much user-touched positions are shifted based on the generated key codes. The reason why "virtual key area" described above is provided is because even if the user touches the outside of the keys positioned on the edge of the virtual keyboard, the key codes corresponding to the touch positions are generated. Further, this is why the "amount of shift" described below can be calculated based on a meaningless character string with the "shifted key codes."

Figure 7:
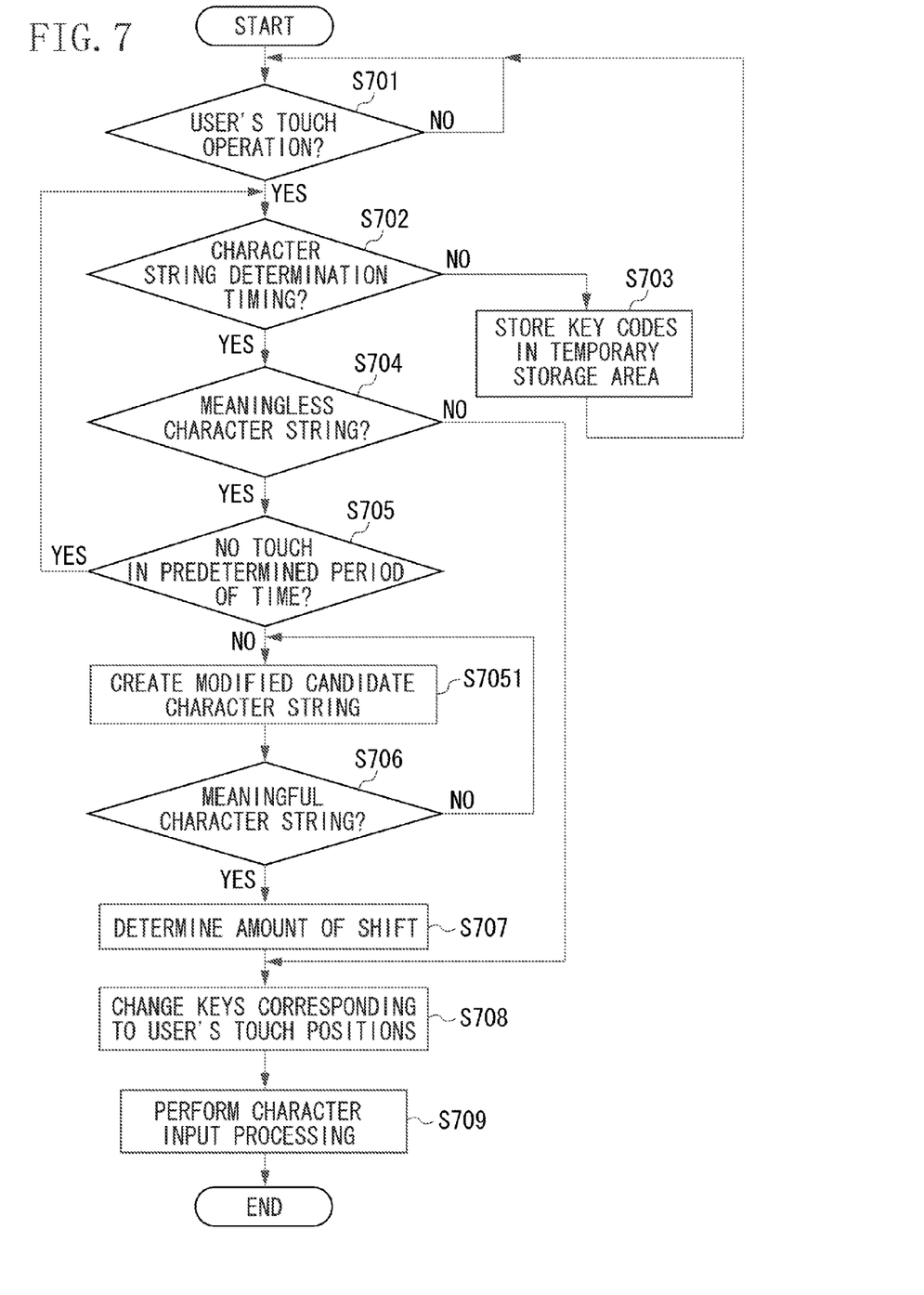
FIG. 7 is a flowchart illustrating a flow of a determination processing in the HMD according to the third exemplary embodiment of the present invention.

FIG. 7 is a flowchart illustrating a flow of a determination processing in the HMD according to the present exemplary embodiment.

In step S701, when detecting a touch operation by the user (YES in step S701), in step S702, the CPU 150 determines whether the timing is a character string determination timing under a predetermined condition. When the timing is not a character string determination timing (NO in step S702), in step S703, the CPU 150 stores the input key codes in a temporary storage area in the memory 160.

At a character string determination timing (YES in step S702), in step S704, the CPU 150 reads the character string stored in the memory 160 and determines whether the character string is a meaningless character string having no meaning (meaning determination). That is, the CPU 150 searches whether the character string is included in the previously-stored dictionary data, and determines whether the character string is a meaningless character string based on the search result. For example, when "konnnitiha" is input in the Romaji input mode for character string input, it corresponds to a word registered in the dictionary data and thus the character string is determined as a meaningful character string. When "lpmmmoyojs" is input, it does not correspond to any word registered in the dictionary, and thus it is determined as a meaningless character string. Alternatively, in case of input in the Romaji input mode, if a combination of three input alphabets cannot be converted into any "Japanese kana", the string can be determined as meaningless. When the character string is a meaningful character string, the processing proceeds to step S709 to perform kana/kanji conversion.

On the other hand, when the character string is a meaningless character string (YES in step S704), the processing proceeds to step S705. A user's touch is waited, and if a touch is not done for a predetermined period of time (10 seconds, for example) (NO in step S705), in step S7051, a modified candidate is generated.

In step S7051, the CPU 150 shifts the input character string by a predetermined amount according to the key arrangement on the keyboard, and generates a modified candidate character string (modified candidate generation). The amount of shift is one character to the right, one character to the left, one character to the lower left, one character to the lower right, one character to the upper left, one character to the upper right, two characters to the right, . . . , n characters to the right, or the like. A modified candidate character string is temporarily stored in the temporary storage area in the memory 160.

(A limit of) the amount of shift in modified candidate generation may be determined depending on a vibration/impact detected by the position/angle sensor. That is, for example, when the position/angle sensor does not detect a vibration/impact with a predetermined magnitude or more, the amount of shift may be "up to one key." The modified candidate character string is created for calibrating a "shift" between a position of the actual object viewable to the user and a display position of the overlapped and displayed keyboard when a mounting state of the HMD on the user changes. Thus, when it can be estimated that the mounting state does not largely change based on detection by the position/angle sensor, the amount of shift is limited, and thereby a calculation/processing time for the calibration can be reduced.

In step S706, the CPU 150 determines whether the created modified candidate character string is a meaningful character string. When it is not a meaningful character string (NO in step S706), the processing returns to step S705 to create a next modified candidate character string.

In step S705, a plurality of modified candidate character strings are previously created and the created modified candidate character strings may be registered in a modified candidate table. The table may be stored in the memory 160. The CPU 150 determines whether each candidate character string registered in the table is the meaningful character string described above.

When a meaningful character string is found (YES in step S706), the processing proceeds to step S707, where the CPU 150 determines the amount of shift for the meaningful character string and stores it in the memory 160. In step S708, the CPU 150 reads the determined amount of shift from the memory 160, and changes the keys corresponding to the touch positions by the user on the shot image depending on the amount of shift. For example, when the amount of shift is "one character to the right", the CPU 150 changes the corresponding touch position on the shot image from the key F to the key G. Specifically, a key allocation (touch position allocation) table for managing a correspondence between coordinate data in a video from the imaging unit 102 and keys corresponding thereto is changed for each key, and is stored in the memory 160.

In step S709, the CPU 150 performs a character input processing such as kana/kanji conversion processing. For example, a meaningful character string is subjected to the kana/kanji conversion processing to display a converted character candidate on the display unit 104. Accordingly, for example, when the user designates "next candidate", the CPU 150 displays a next candidate on the display unit 104. Alternatively, when the user designates "OK", the CPU 150 determines the character input.

The description will be supplemented by way of an example in which the user inputs Japanese greetings in the Romaji input mode, for example. It is assumed that when the user inputs a text in a touch operation on an actual object, the positions of the keys corresponding to the recognized touch positions in the imaged video are shifted by one key to the right from the display position of the keyboard as viewed from the user, for example. In this case, "konnnitiha" should be input in the Roman alphabets if a "shift" is not present, but "lpmmmoyojs" is input due to the "shift." Meanwhile, the CPU 150 buffers (temporarily accumulates) the input key codes each time the user touches a key (step S703). "l" "p" "m" "m" "m" "o" "y" "o" "j" "s" are buffered in this order.

At a character string determination timing under a predetermined condition (step S702), in step S704, the CPU 150 detects whether the buffered character string "lpmmmoyojs" is a meaningless character string. In this case, the character string is a meaningless character string, and thus, in step S705, the CPU 150 creates a modified candidate table by shifting the key codes by a predetermined amount according to the key arrangement for the meaningless character string "lpmmmoyojs".

Figure 8:
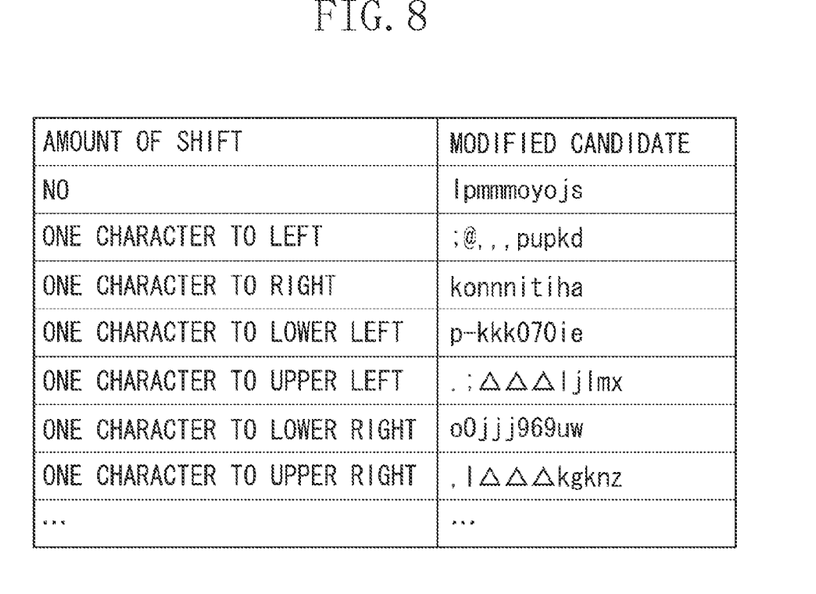
FIG. 8 is a diagram illustrating an exemplary modified candidate table according to the present exemplary embodiment.

FIG. 8 is a diagram illustrating an example of the thus-created modified candidate table.

The CPU 150 collates the modified candidate character strings in the modified candidate table with the words (meaningful character strings) registered in the dictionary data described above. In the case of FIG. 8, the character string "konnnitiha" with the "amount of shift" of "one character to the right" has the maximum amount of match, and thus the CPU 150 acquires the modified character string "konnnitiha", and acquires the "amount of shift" of "one character to the right." The CPU 150 shifts and reallocates the key codes generated corresponding to the touch positions in the imaged video by the "amount of shift." Thereby, a "shift" between the key position corresponding to the touch position in the imaged video and the display position of the keyboard viewed from the user can be eliminated. In the present exemplary embodiment, an example of an input in the Romaji input mode has been described. However, even in an English input mode, it is possible to determine whether an input character string is a meaningless character string or a meaningful character string. For example, when a user desires to input the word "hello", the touch position is shifted and then, a user inputs "jr;;p". Since it is not included in the dictionary data, it is determined that it is a meaningless character string.

According to the present exemplary embodiment, when a character string generated by input key codes is a "meaningless character string", the amount of shift by which the character string becomes a "meaningful character string" is determined. Further, allocation of the key codes generated corresponding to the touch positions in the imaged video is changed based on the determined amount of shift. Thus, even when a mounting state of a glass see-through type HMD changes due to a vibration, a correspondence between the key positions on the display unit 104 visually recognized by the user and the position coordinates of the touch operation in the imaged video can be made appropriate. Thereby, a touch operation by the user on an actual object in the real world can be accurately recognized as a touch operation on the keyboard in augmented reality display.

The exemplary embodiment of the present invention enables a HMD type information processing terminal capable of a touch GUI whose display is easily viewable to a user to be realized.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-081476 filed Apr. 10, 2014, which is hereby incorporated by reference herein in its entirety.

What is claimed is:

1. An information processing terminal comprising:
    an imaging unit configured to image a video in front of the head of a user;
    a glass see-through type head mounted display unit configured to overlap and display an image of a keyboard arranging a plurality of keys therein as a virtual object on the video in the real world;
    a touch determination unit configured to determine a touch by the user on an actual object in the real world in the video;
    a determination unit configured to, when the touch determination unit determines a touch by the user on the actual object, determine that a touch operation is performed on the keyboard overlapped and displayed as the virtual object on the actual object;
    a calibration unit configured to cause a coordinate of a position determined as touched by the touch determination unit in the video to accord with coordinates of display positions of the virtual object; and
    a generation unit configured to generate a character string by key codes of keys corresponding to user's touch positions on the displayed keyboard that is the virtual object, determined by the touch determination unit,
    wherein when a key that is not virtually displayed is defined in advance around the keyboard as the virtual object and the coordinate determined as touched by the touch determination unit is a coordinate around the keyboard as the virtual object in the video, the generation unit is configured to generate a key code of the key that is not virtually displayed, and
    wherein when the generated character string is a meaningless character string having no meaning, one or more modified candidate character strings obtained by shifting each character included in the character string by a predetermined amount on the keyboard are generated.

2. The information processing terminal according to claim 1, further comprising
    a touch position allocation change unit configured to change allocation of a touch position corresponding to each key on the keyboard depending on the amount of shift when the generated modified candidate character string is a meaningful character string.

3. The information processing terminal according to claim 1, further comprising
    a Romaji input mode switching unit configured to set the keyboard in the Romaji input mode,
    wherein when the keyboard is in the Romaji input mode, the modified candidate generation unit generates a modified character string when a combination of three alphabets input by the user cannot be converted into any Japanese kana.

4. An information processing method in an information processing terminal comprising an imaging unit configured to image a video in front of the head of a user, a display unit configured to overlap and display an image of a keyboard arranging a plurality of keys therein as a virtual object on the video in the real world, and a touch determination unit configured to determine a touch by the user on an actual object in the real world in the video, the method comprising:

when the touch determination unit determines a touch by the user on the actual object, determining that a touch operation is performed on the keyboard overlapped and displayed as the virtual object on the actual object; and generating a character string by key codes of keys corresponding to user's touch positions on the displayed keyboard that is the virtual object, determined by the touch determination unit, wherein when a key that is not virtually displayed is defined in advance around the keyboard as the virtual object and the coordinate determined as touched by the touch determination unit is a coordinate around the keyboard as the virtual object in the video, a key code of the key that is not virtually displayed is generated, and wherein when the generated character string is a meaningless character string having no meaning, one or more modified candidate character strings obtained by shifting each character included in the character string by a predetermined amount on the keyboard are generated.

5. A non-transitory computer-readable storage medium storing therein a program for causing a computer to perform the method according to claim 4.

6. The information processing terminal according to claim 2, wherein when the generated character string is a meaningless character string having no meaning, the touch position allocation change unit is configured to generate a corrected character string after a predetermined number of characters is input.

7. An information processing terminal comprising:

an imaging unit configured to image a video in front of the head of a user;

a glass see-through type head mounted display unit configured to overlap and display an image of a virtual object on the video in the real world;

a touch determination unit configured to determine a touch by the user on an actual object in the real world in the video;

a determination unit configured to, when the touch determination unit determines a touch by the user on the actual object, determine that a touch operation is performed on the virtual object overlapped and displayed as the virtual object on the actual object;

wherein when a key that is not virtually displayed is defined in advance around the keyboard as the virtual object and the coordinate determined as touched by the touch determination unit is a coordinate around the keyboard as the virtual object in the video, a key code of the key that is not virtually displayed is generated, and a calibration unit configured to cause a coordinate of a position determined as touched by the touch determination unit in the video to accord with coordinates of display positions of the virtual object.

8. An information processing terminal comprising:

an imaging unit configured to image a video in front of the head of a user;

a glass see-through type head mounted display unit configured to overlap and display an image of a keyboard arranging a plurality of keys therein as a virtual object on the video in the real world;

a touch determination unit configured to determine a touch by the user on an actual object in the real world in the video;

a determination unit configured to, when the touch determination unit determines a touch by the user on the actual object, determine that a touch operation is performed on the keyboard overlapped and displayed as the virtual object on the actual object;

a generation unit configured to generate a character string by key codes of keys corresponding to user's touch positions on the displayed keyboard that is the virtual object, determined by the touch determination unit, wherein when a key that is not virtually displayed is defined in advance around the keyboard as the virtual object and the coordinate determined as touched by the touch determination unit is a coordinate around the keyboard as the virtual object in the video, the generation unit is configured to generate a key code of the key that is not virtually displayed, and wherein when the generated character string is a meaningless character string having no meaning, one or more modified candidate character strings obtained by shifting each character included in the character string by a predetermined amount on the keyboard are generated.

\* \* \* \* \*